United States Patent [19]

Tower et al.

[11] Patent Number: 4,702,879
[45] Date of Patent: Oct. 27, 1987

[54] NUCLEAR REACTOR WITH PASSIVE SAFETY SYSTEM

[75] Inventors: Stephen N. Tower, Washington Township, Westmoreland County; Terry L. Schulz, Murrysville Boro, both of Pa.

[73] Assignee: Westinghouse Electric Corp., Pittsburgh, Pa.

[21] Appl. No.: 872,985

[22] Filed: Jun. 11, 1986

[51] Int. Cl.⁴ .................. G21C 13/00; G21C 15/18
[52] U.S. Cl. ............................... 376/282; 376/283; 376/289; 376/293; 376/294; 376/298; 376/299
[58] Field of Search ............... 376/282, 283, 289, 293, 376/294, 298, 299

[56] References Cited

U.S. PATENT DOCUMENTS

| | | | |
|---|---|---|---|
| 3,159,550 | 12/1964 | Laming | 376/289 |
| 3,235,463 | 2/1966 | Sankovich | 376/294 |
| 3,262,820 | 7/1966 | Whitelaw | 376/294 |
| 3,276,965 | 10/1966 | Leyse | 376/294 |
| 3,578,564 | 5/1971 | Fletcher, III | 376/294 |
| 3,666,616 | 5/1972 | Schluderberg | 376/283 |
| 3,711,371 | 1/1973 | Cahill, Jr. | 376/294 |
| 3,868,302 | 2/1975 | Singleton | 376/289 |
| 4,526,742 | 7/1985 | Hannerz | 376/282 |

FOREIGN PATENT DOCUMENTS

| | | | |
|---|---|---|---|
| 26705 | 4/1981 | European Pat. Off. | 376/282 |
| 29372 | 5/1981 | European Pat. Off. | 376/282 |
| 30698 | 6/1981 | European Pat. Off. | 376/282 |
| 1244308 | 7/1967 | Fed. Rep. of Germany | 376/294 |
| 1564546 | 12/1969 | Fed. Rep. of Germany | 376/299 |
| 2506063 | 11/1982 | France | 376/293 |
| 476476 | 2/1972 | Japan | 376/289 |

Primary Examiner—Deborah L. Kyle
Assistant Examiner—Richard W. Wendtland
Attorney, Agent, or Firm—Daniel C. Abeles

[57] ABSTRACT

A pressurized nuclear water reactor has a substantially cylindrical flow liner with a cylindrical wall section and bottom and an open top. A barrel forms a riser chamber that contains the core in the flow liner. A pressure vessel contains the cylindrical flow liner to form a second annular chamber therebetween that contains a supplementary liquid coolant, with insulation means to provide a major portion of the supplementary liquid coolant at a first temperature and a minor portion thereof at a second higher temperature. Upon depressurization in the vessel, fluid communication means enable injection of supplementary liquid coolant from the second annular chamber into the core upon flashing of a minor portion to vapor. A further pool of water outside the pressure vessel, and insulation on the wall, maintain the desired temperature in the supplementary liquid coolant supply. Injection or removal of borated solution, as a chemistry control solution, into or from the supplementary liquid coolant is provided. A passive safety system incorporates the reactor with means for circulating water solely by natural convection from the hot leg to the cold leg of the primary coolant system and has heat exchange means associated therewith.

14 Claims, 6 Drawing Figures

NUCLEAR REACTOR WITH PASSIVE SAFETY SYSTEM

BACKGROUND OF THE INVENTION

The present invention relates to an improved pressurized water nuclear reactor having an integral means for in-core spraying of a liquid coolant in case of a loss of coolant event, and a passive safety system incorporating an improved reactor vessel.

The nuclear power industry has been making efforts to provide for more safe operation of nuclear reactors. While some efforts have taken the form of adding more "active" safety features and then performing probability analyses to show that risks are very small, a portion of the public has remained unconvinced. In such active systems of the prior art, a large number of components such as pumps and fans which may be electrically powered, and optionally diesel powered in the event of electric failure, are provided. Thus, in a pipe break, termed a loss of coolant accident, water is provided to the primary circuit and then the reactor vessel by pumps. Additionally, motor-driven fans as well as pump-operated spray devices, are used to remove containment heat. The reactor decay heat and heat from containment is also transferred into an emergency cooling water system. These safety systems are all required to be redundant in order that failure of a component will not render the safety system ineffective. Thus, the active approach to nuclear plant safety results in plant designs of highly complex and costly design.

The need thus exists for a nuclear reactor, of the pressurized water reactor type, which is convincingly safe to one and all without significant increase in costs, which are already high. The most likely approach is thus a system which is of a "passive" nature, i.e. which requires little or no operator action but rather uses gravity or stored energy to perform its functions.

It is an object of the present invention to provide a pressurized water nuclear reactor which has a large volume of relatively cold supplementary pressurized water integral within the reactor vessel, which supplementary water is sprayed into the core of the reactor upon occurrence of a loss of coolant accident in the primary coolant circuit, without need for pumps or other active components.

It is another object of the present invention to provide a passive safety system incorporating the reactor of the present invention.

SUMMARY OF THE INVENTION

A pressurized water nuclear reactor having a passive system for in-core spraying of liquid coolant uses an accumulated supply of liquid coolant, a portion of which flashes to form steam upon depressurization of the reactor, to force coolant into the core region of the reactor.

The reactor has a substantially cylindrical flow liner that has an open top, a cylindrical wall section, and a bottom wall, with said cylindrical wall section forming therein a lower reactor internals chamber. A cylindrical barrel is disposed in the flow liner spaced from the bottom thereof, to form an annular chamber thereabout and a riser chamber therein, which riser chamber contains the lower reactor internals including the fuel assemblies and control rod assemblies. The flow liner is contained within a pressure vessel that has a removable top, an intermediate cylindrical wall section and a lower wall section, the lower wall section thereof spaced from the flow liner, to form a second annular chamber. The intermediate cylindrical wall section of the pressure vessel has inlet and outlet nozzles that communicate with a cooled coolant return port and a hot coolant discharge port in the flow liner. The hot primary coolant discharge nozzles, and cooled primary inlet nozzles to the annular chamber, are connected to a steam generator, with means provided to circulate the primary coolant therethrough.

A supply of supplementary liquid coolant is provided in the second annular chamber. Insulating means are provided to maintain a major portion of the supplementary liquid coolant at a first elevated temperature and a localized minor portion of the supplementary liquid coolant at a second, higher, elevated temperature. Means are provided to effect communication between the second annular chamber and the riser chamber in the cylindrical flow liner and provide for spraying of supplementary liquid coolant into the core in the riser chamber. The communicating means preferably comprise axially aligned openings in the bottom wall of the flow riser and the barrel bottom support plate with tubular elements connecting said openings and elongated tubular elements having spaced apertures therealong disposed within the core assembly.

Upon depressurization of the interior of the substantially cylindrical flow liner and concomitantly the second annular chamber, the higher elevated temperature localized portion of the supplementary coolant flashes to a vapor and the increase in volume, so produced, forces the supplementary liquid coolant into the core region in the riser chamber.

Means for injecting and removing coolant chemistry control solution, such as a borated water solution, are provided on the pressure resistant vessel, and a pool of liquid is provided about the pressure resistant vessel to further cool the supplementary liquid coolant.

The passive safety system incorporates the reactor with means for circulating water solely by natural convection, from the hot leg to the cold leg of the primary coolant system, including a heat exchange means and a means for introducing stored coolant, under superatmospheric pressure, into the substantially cylindrical vessel.

DETAILED DESCRIPTION

The present invention relates to an improved pressurized water nuclear reactor having a passive system for in-core spraying of coolant and a passive safety system incorporating the present reactor.

Figure 1:
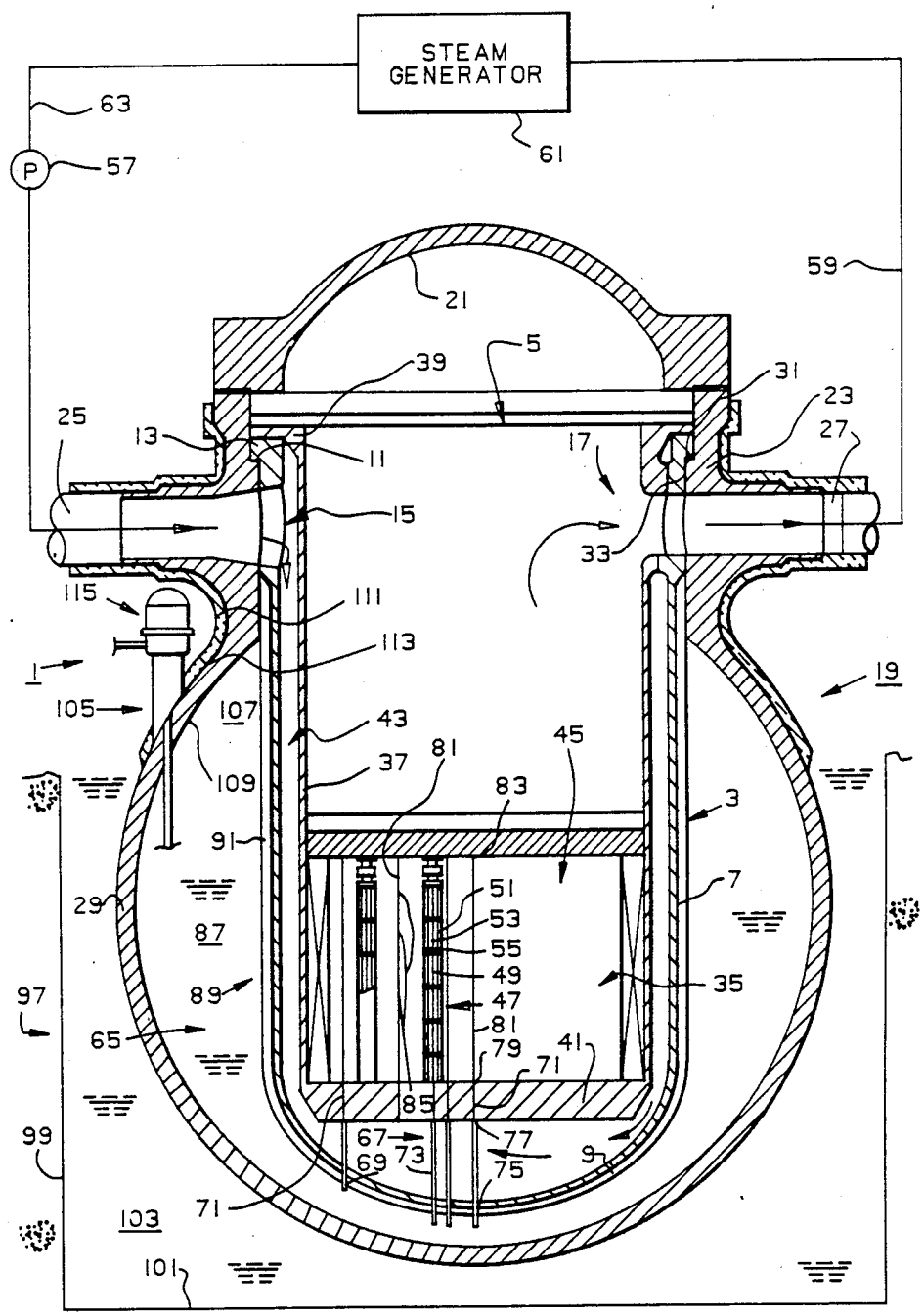
FIG. 1 is an elevational view, partially in cross-section of a nuclear reactor of the present invention.

Referring now to the drawings, FIG. 1 illustrates an embodiment of the nuclear reactor 1 of the present invention. As illustrated, a substantially cylindrical flow liner 3 has an open top 5, a cylindrical wall section 7 and a bottom 9. The cylindrical wall section 7 has an outwardly directed support flange 11 about the top wall 13 thereof, and at least one inlet port 15, preferably 2 to 4 thereof, and at least one outlet port 17, preferably 2 to 4 thereof, therethrough. The flow liner 3 is vertically disposed in, and enclosed within a pressure vessel 19, which has an upper, removable, pressure resistant top 21, an intermediate pressure resistant cylindrical wall section 23 having at least one inlet nozzle 25, preferably 2 to 4 thereof, and at least one outlet nozzle 27, preferably 2 to 4 thereof, therein, which are adapted to communicate with the inlet ports 15 and outlet ports 17 of the flow liner 3, and a pressure resistant spherical lower wall section 29 which encloses the cylindrical wall section 7 and bottom 9 of the flow liner 3. The intermediate pressure resistant cylindrical wall section 23 has a ledge 31 about the inner surface 33 thereof, upon which the outwardly directed support flange 11 of the flow liner rests and is supported thereby.

The cylindrical wall section 7 of the flow liner 3 forms therein a riser chamber 35 for positioning of the lower reactor internals. Contained within, and spaced from, the cylindrical wall section 7 of the flow liner 3 is an upright cylindrical barrel 37, the barrel supported within the flow liner 3, such as by outwardly directed flange 39 resting on the top wall 13 of the flow liner. The upright cylindrical barrel 37 has a bottom support plate 41 which is spaced from the bottom wall 9 of the flow liner 3. The spaced upright cylindrical barrel 37 and cylindrical wall section 7 of the flow liner 3 form an annular coolant downcomer annulus or passage 43, while the barrel forms the upright riser chamber 35 therein.

The lower reactor internals portion 45 contains a nuclear core 47 having a plurality of fuel assemblies 49. Each fuel assembly 49, as is conventional, contains a plurality of elongated fuel rods 51 containing a nuclear fuel that provides a fission-type chain reaction, and a plurality of elongated control rod assemblies 53 contained within elongated thimbles 55 disposed between the fuel rods 51, all of which are located within the riser chamber 35. Mechanisms (not shown) for control of the placement of the fuel rods and control rods are provided in the upper section of the flow liner, as in conventional reactor systems. Pump means 57 are provided to circulate primary coolant which circulates hot primary coolant through port 17 and from the outlet nozzle 27 through line 59, and a steam generator 61, and then returns the same to the inlet nozzle 25 by means of line 63. In operation, hot primary coolant, after heating by passage through the core 47, is discharged through outlet port 17 and outlet nozzle 27, cooled, and returned through inlet port 15 and inlet nozzle 25. From inlet nozzle 25, the cool primary coolant, at an elevated pressure, flows downwardly through the downcomer or annular passage 43, and thence upwardly through the nuclear core 47 and riser chamber 35 where the same is heated, and is then directed to the outlet nozzle 27 for discharge.

As illustrated in FIG. 1, the spherical lower wall section 29 of the pressure vessel 19 is spaced from the cylindrical wall section 7 and bottom 9 to form a second annular chamber 65. In effect, the pressure resistant top 21, intermediate pressure resistant cylindrical wall section 23 and pressure resistant spherical lower wall section 29 form a pressure resistant boundary for the nuclear core and primary coolant circulation system.

In order to provide for fluid communication between the second annular chamber 65 and the riser 35, a plurality of fluid communication means 67 are provided, which include at least one opening 69 through the flow liner bottom wall 9, an axially aligned opening 71 through the spaced bottom support plate 41 and means for providing flow communication between the openings 69 and 71, such as hollow tubular members 73, one end 75 of which is connected to the bottom wall 9 and surrounds opening 69, and the other end 77 of which is connected to the bottom support plate 41 and surrounds opening 71. At the other end 79 of opening 71, and connected to bottom support plate 41, is an elongated thimble 81 which extends upwardly into the riser 35 within and part of the fuel assembly 49, the thimble 81 being closed at its upper end 83 and having a plurality of spaced apertures 85 therealong, from the bottom of the fuel assembly to its top end 83.

Figures 2, 3:
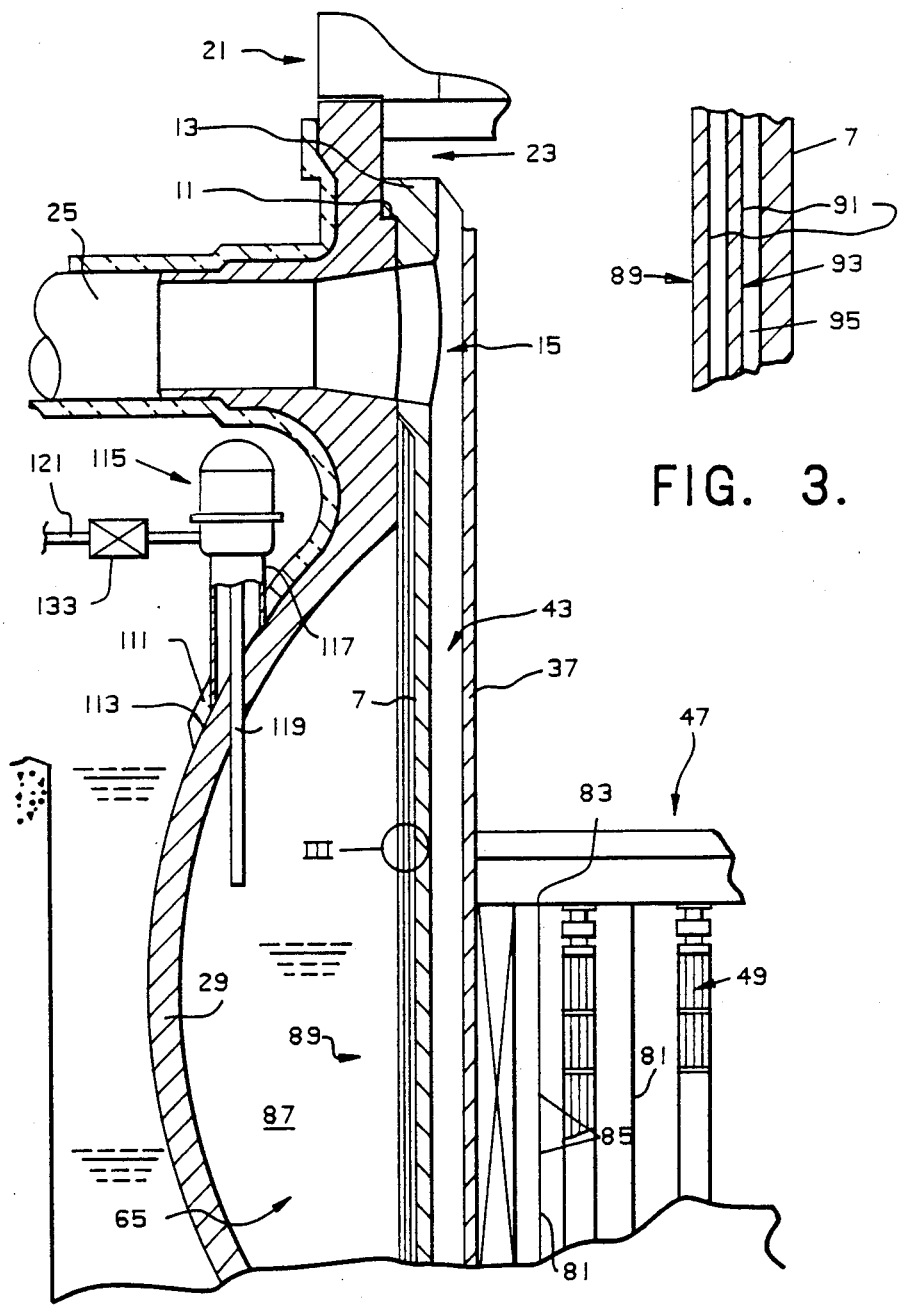
FIG. 2 is an enlarged view of the upper region of the portion of the reactor of FIG. 1 illustrating the means for injecting and/or removing chemistry control solution of the liquid coolant contained in the second annular chamber of the reactor.
FIG. 3 is a cross-sectional view of an insulating means used in the cylindrical wall section taken at the circled area III of FIG. 2.

A supply of supplementary liquid coolant 87 is contained in the second annular chamber 65 between flow liner cylindrical wall section 7, bottom 9, and pressure resistant wall 29, with flow communication between the second annular chamber 65 and the riser 35 provided through the flow communication means 67. Means 89 for cooling the major portion of the supplementary liquid coolant 87 in the annular chamber 65, to a first elevated temperature, comprises thermal insulation means 89 in the cylindrical wall section 7 and bottom 9 within the pressure resistant spherical lower wall section 29. In FIG. 1, such insulation means comprises forming the wall section 7 and bottom 9 of closely spaced planar sheets 91 (FIG. 3) of material such as stainless steel, with compartments 93 between adjacent spaced sheets, the compartments filled with a liquid 95, such as water.

To further cool the major portion of the supplementary liquid coolant 87 in the annular chamber 65, the pressure resistant spherical lower wall section 29 is disposed in an enclosure, such as a container 97 with walls 99 and bottom 101, with a pool of further liquid 103 disposed in the container 97 between the pressure resistant wall 29 and the walls 99 and bottom 101 of the container.

While a major portion of the supplementary liquid coolant 87 in the annular chamber 65 is cooled, means 105 are provided to maintain a localized minor portion thereof, indicated at 107, at a second elevated temperature, which is a temperature in excess of that of the first elevated temperature. Such means can comprise exposing an upper region 109 of the pressure resistant spherical lower wall section 29 to the atmosphere without submergence in the pool 103 of liquid coolant, and a layer 111 of a heat insulative material disposed on the outer surface 113 of the exposed upper region 109 of the pressure resistant spherical lower wall section 29.

Figure 4:
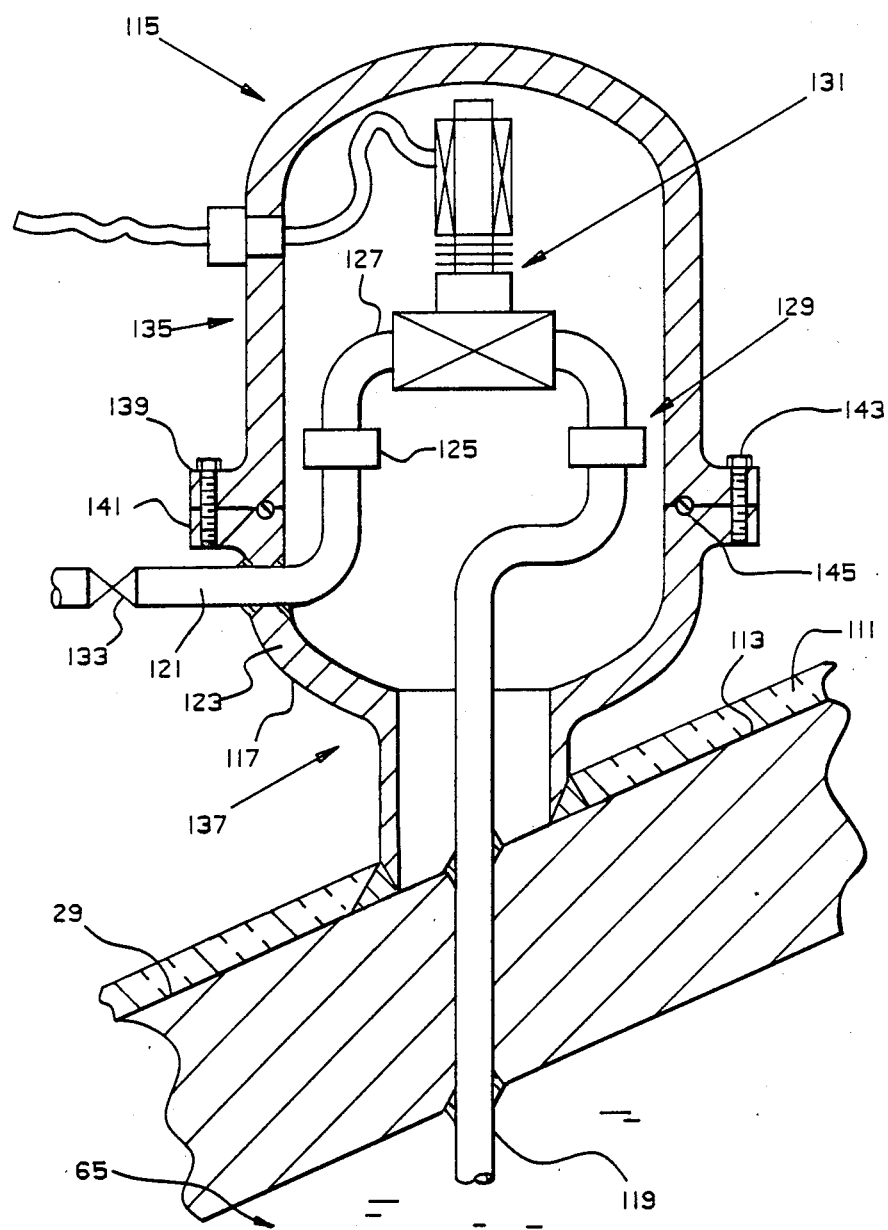
FIG. 4 is a view, partially in cross-section of a means for injecting and/or removing chemistry control solution of the liquid coolant contained in the second annular chamber of the reactor.

A means 115 is attached to pressure resistant spherical lower wall section 29 to enable injection into, and removal from, the supplementary liquid coolant 87, in second annular chamber 65, of a borated or other chemistry control solution. As illustrated in FIG. 4, means 115 includes an enclosure 117 attached to the pressure resistant spherical lower wall section 29, with a conduit 119 extending through the wall. A pipe 121, connected to a source of chemistry control solution (not shown) extends through the wall 123 of the enclosure and is connected, such as by tube connector 125 to an intermediate pipe 127, with the intermediate pipe 127 connected at its other end by a tube connector 129 to the conduit 119, all within the enclosure 117. A solenoid block valve 131 (fail close) is provided in intermediate pipe 127. A valve 133 is also provided in line 121. The enclosure may be formed of upper section 135 and lower section 137 connected together at flanged portions 139 and 141, respectively, by bolts 143, and with a gasket 145 provided, to permit inspection and repair.

The present reactor contains a supply of supplementary liquid coolant in the second annular chamber 65, with the pressure resistant spherical lower wall section 29 comprising the lower primary coolant system boundary. The supplementary liquid coolant 87 is thus at the same pressure, such as about 2250 pounds per square inch absolute (psia) or 155.1 bar, as the primary coolant passing through the flow liner 3, because of the fluid communication means 67. Energy for forcing supplementary coolant into the core, through fluid communication means 67 is provided by allowing a minor portion (less than 10 percent) of the supply of liquid supplementary coolant to be contained at the second elevated temperature, above the first elevated temperature of the major portion of the supplementary coolant supply. The second elevated temperature of a localized minor portion of the supplementary coolant is achieved by means 105, by conduction, and natural convection, with the primary system cold leg temperature (about 288°–293° C.).

In the circumstance of a loss of coolant event, the primary reactor coolant system is rapidly depressurized, causing a resultant reduction in pressure in the second annular chamber 65 containing the supplementary liquid coolant 87. When the pressure in the second annular chamber 65 reaches the saturation pressure in the hot localized minor portion 107 of the liquid supplementary coolant 87 (about 1050 psia at 550° F. or 72.4 bar at 288° C.), that localized minor portion will begin to flash into a water/steam mixture. This flashing, with a resultant large volume expansion at the localized portion of the supplementary liquid coolant, drives the coolant major portion thereof downwardly and then into the openings 69 in the flow liner bottom 9, and then upwardly through hollow tubular members 73 and into the elongated thimbles 81, from which supplementary liquid coolant is sprayed through apertures 85 directly into the core 47. Thus, liquid supplementary coolant is charged directly to the core heat generation source rather than puddling it into the downcomer or the bottom of the vessel where much can be lost to a break without any cooling of the core.

The present system relies, for practicality, on the ability to maintain a major portion of the supplementary liquid coolant (about 90 percent or more) at the first elevated temperature (about 149° C.) while a minor localized portion (about 10 percent or less) of the supplementary liquid coolant is maintained at the second elevated temperature close to the cold leg temperature (about 288° C.). The insulation means 89 of the cylindrical wall section 7 and bottom wall 9 limits heat loss from the reactor primary coolant system. The external pool of water 103 transfers the thermal and radiation energy lost from the reactor primary coolant system into the supply of supplementary liquid coolant 87 by cooling the pressure resistant spherical lower wall section 29 to about the boiling point of water (about 93°–121° C.). The localized minor portion of the supplementary liquid coolant 107, is above the level of the pool of water 103 and is insulated by layer 111 of heat insulative material. Therefore, the heat loss from the minor localized portion 107 is minimal and the liquid supplementary coolant therein is heated by the losses through the cylindrical wall section 7 of flow liner 3, and by wall conduction from the hot nozzle belt in the intermediate section 23 of the pressure vessel. Since the supplementary liquid coolant is essentially stagnant during normal operation of the reactor 1, stable stratification will occur due to density difference, with hot fluid (about 288° C.) at the top and cold fluid (about 149° C.) at the bottom in the supply of supplementary liquid coolant 87.

The supplementary liquid coolant 87 can contain boron as dissolved boric acid to enable a chemical shimming and shutdown of the nuclear reaction. There is little or no mixing between the supplementary liquid coolant and the primary coolant passing through the riser because the supplementary liquid coolant is stagnant water, the interconnecting hollow tube cross-sectional area is small, and temperature/density difference between systems inhibit mixing at the interface.

As an indication of the features and design of the reactor vessel, for a 600 MWe pressurized water reactor, the following would be descriptive. The design would employ 145 standard Westinghouse 17×17 fuel assemblies with an active core length of 10 feet to produce 1800 MW of thermal energy and about 600 MW of electricity. The reactor coolant system employs soluble boron for burnup compensation and cold shutdown reactivity control. The reactor vessel upper and lower internals is typical of Westinghouse standard design except that the upper internals package will be modified to incorporate a top insertion incore instrumentation system. The core 47 and internals fit inside a 3.4 meter outer diameter core barrel 37 which, in turn, fits inside a 3.7 meter inner diameter cylindrical wall section 7 of a flow liner 3, which is supported from a flange 11 near the top of the vessel 19. The wall section 7 and bottom 9 are made of austenitic stainless steel and are about 8.9 cm. thick. This wall thickness is sufficient to prevent collapsing of the wall due to the external pressure differential which develops during a loss of coolant accident. The wall 7 and bottom 9 are covered by a 7.6 cm. thick layer of thermal insulation. The pressure resistant spherical lower wall section 29 is a 7.3 meter inner diameter spherical wall, about 18.3 cm. thick, made of a low alloy carbon steel designed for 2500 psig (pounds per square inch gauge; or 172.4 bar) at 343° C. The sperical shape reduces wall thickness and weight compared to a cylindrical shape but incurs the disadvantage of increasing the diameter of the reactor. The wall section 29 is clad on the inside with 304 stainless steel. The second annular chamber 65 provides approximately 119 m³ of supplementary liquid coolant whose temperature is controlled as hereinbefore described. There are 145 tubular connectors 73 penetrating the bottom wall 9 and leading to the thimbles 81 of each fuel assembly.

The fuel assembly zircaloy thimbles 81 are 1.1 cm. inner diameter and are preforated over the entire length with 240 evenly distributed 0.13 cm. diameter apertures 85. When a pressure differential between the riser chamber 35 and second annular chamber 65 of about 130 pounds per square inch or 9 bar is developed, 94.6 liters per minute per thimble, or a total of 197.3 kg. per second of supplementary liquid coolant will be sprayed through the apertures 85 in thimbles 81 into the core 47. This will adequately cool the core 47 during a loss of coolant accident blowdown phase.

The aforedescribed 600 MWe reactor illustrated in FIG. 1 is inspectable. The flow liner 3 with its integral insulation can be removed and placed in a refueling cavity for inspection and repair. The inside and outside of the pressure resistant vessel 19 are then fully accessible for visual and ultrasonic testing inspection.

Figure 5:
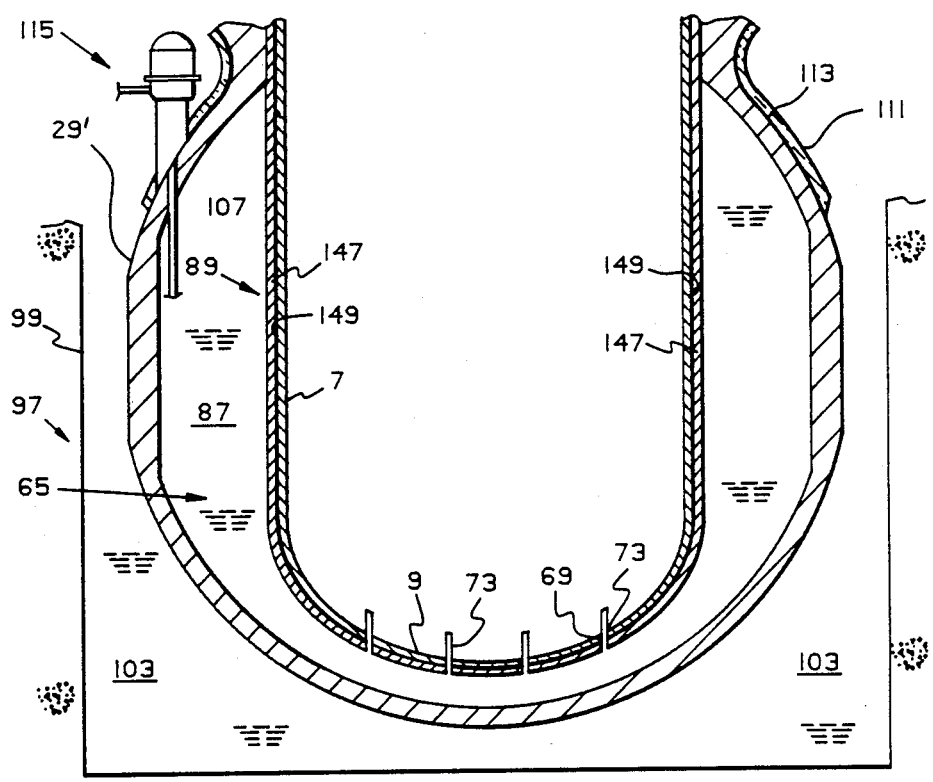
FIG. 5 is an elevational view, in cross-section, illustrating another embodiment of the pressure resistant wall of the reactor of the present invention having a cylindrical shape and another embodiment of the insulating means.

Another embodiment of the present reactor, using a cylindrically shaped pressure resistant lower wall section 29' is illustrated in FIG. 5. As illustrated therein, the pressure resistant lower wall section 29' is cylindrical in shape and spaced from cylindrical wall section 7 and bottom 9 of the flow liner 3. In this embodiment also, the insulating means 89 is illustrated as a layer of insulating material 147 on the outer surface 149 of the wall 7 and bottom 9.

The nuclear reactor of the present invention is readily incorporated into a passive safety system. For example, the reactor with its supplementary liquid coolant supply may be incorporated into a passive safety system such as that described in co-pending application "Passive Safety System For A Pressurized Water Nuclear Reactor" filed Feb. 7, 1986, as Ser. No. 827,115 in the names of L. E. Conway and T. L. Schulz and assigned to the assignee of the present invention, the contents of said application incorporated by reference herein. In incorporating the present reactor into the passive system described in said co-pending application, the two spherical core make-up tanks and their associated piping may be deleted and replaced by the reactor of the present invention, containing supplementary liquid coolant.

Figure 6:
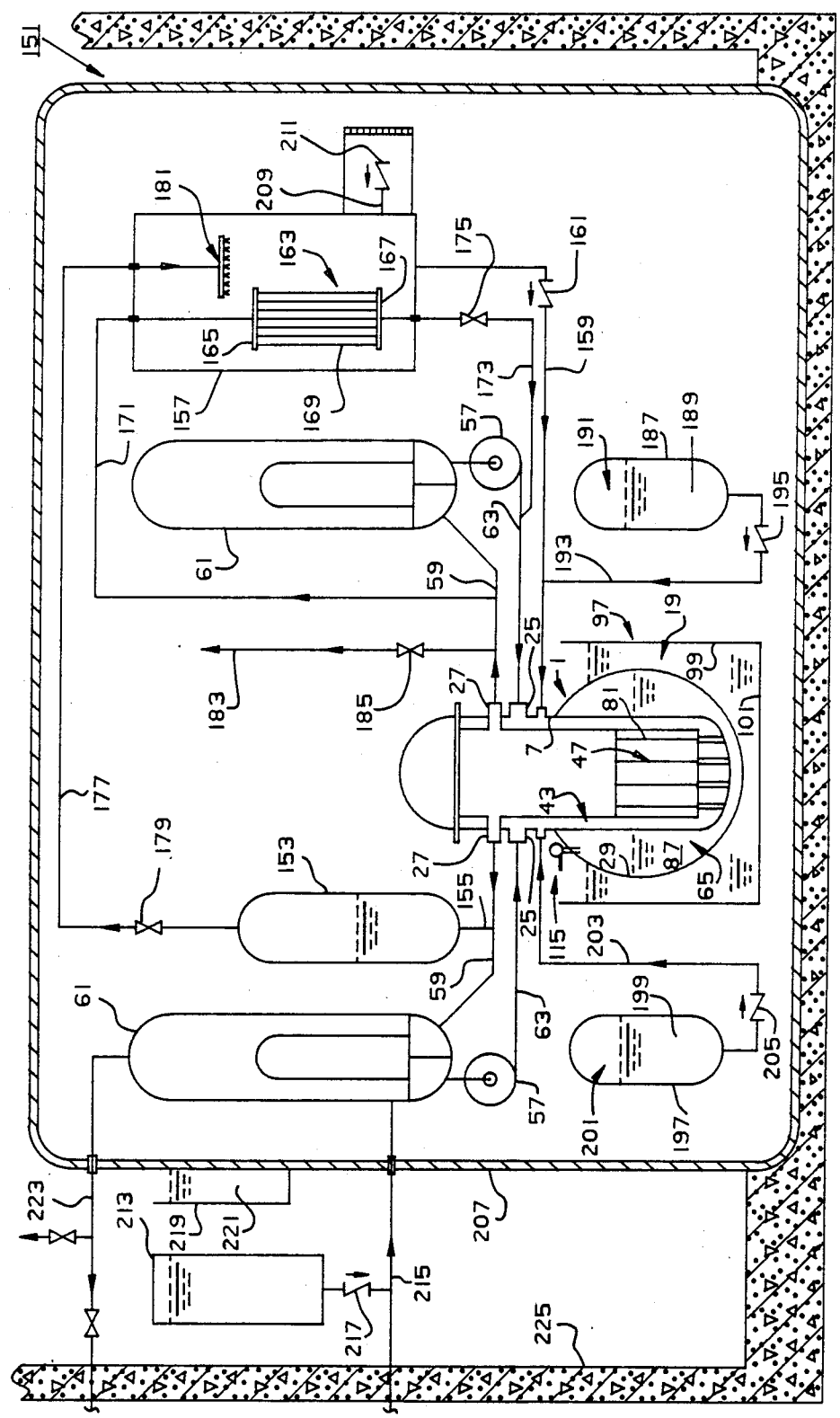
FIG. 6 is a schematic diagrammatical view of a passive safety system incorporating the reactor of the present invention.

An embodiment of the passive safety system 151 incorporating the nuclear reactor of the present invention is schematically illustrated in FIG. 6. As illustrated, the nuclear reactor 1 with the components thereof indicated in the drawing with the same numerals as in the previous description of the reactor 1, wherein two outlet nozzles 27, lines 59, steam generators 61, reactor coolant pumps 57, and inlet nozzles 25 are provided. The nuclear core 47 heats primary coolant, or water circulating in the primary coolant system, with heated water supplied through lines 59, or hot legs, to a pair (or more) of steam generators 61. After heat exchange in the steam generators 61, the cooled primary coolant is returned, by means of reactor coolant pumps 57 to the reactor vessel 19 by means of cold legs or lines 63, where primary coolant is directed through downcomer 43 and thence upwardly through the core 47. A pressurizer 153 communicates with hot leg line 59 by means of a conduit 155 and maintains the required pressure in the primary coolant circuit. An in-containment storage tank 157, with a substantial portion of its volume situated above the level of the reactor coolant piping is connected through line 159 to the downcomer 43 of the flow liner 3, which line 159 contains a check valve 161. The check valve 161 is maintained closed so long as smaller pressure prevails at the tank side of the valve 161 relative to the downcomer side.

The storage tank 157, contains a passive residual heat removal heat exchanger 163, such as that described in copending application Ser. No. 827,115, the heat exchanger normally submerged in water stored in the tank 157 and having a horizontal intake manifold 165, outlet manifold 167 and interconnecting plurality of heat exchange tubes 169. The inlet manifold 165 of heat exchanger 163 is connected with the hot leg or discharge line 59 by means of line 171, while the outlet manifold 167 is connected to the cold leg or inlet line 63 of the reactor by means of line 173, which line 173 contains a normally closed, fail open throttle valve 175.

A line 177 extends from the steam space of the pressurizer 153, line 177 comprising a depressurizing line which opens into the storage tank 157, which line 177 contains a normally closed power operated pressure relief valve 179. Line 177 discharges into the water storage tank 157 through a sprayer 181. A further line 183 is provided to connect hot leg or discharge line 59 to the containment, line 183 containing a normally closed power operated valve 185.

A coolant accumulator tank 187 is provided, which is partially filled with water 189, while a space above the water level contains a pressurized gas 191, such as nitrogen. The tank 187 communicates with line 159, leading to the downcomer 43, through line 193 containing a normally closed valve 195. A second such coolant accumulator tank 197, partially filled with water 199, and having a pressurized gas 201, such as nitrogen, communicates through line 203 containing a normally closed valve 205 to the downcomer 43.

All of the above components of the passive safety system are located within the containment shield 207. An inlet line 209 may be provided on the in-containment storage tank 157, which is normally maintained closed by a check valve 211, which prevents outflow of water from the in-containment water storage tank 157 but permits water flow, when necessary from the flooded containment into the storage tank 157. The line 183, previously described, prevents long term concentration of boric acid in the reactor following a break of the cold leg by allowing a circulation of water from the containment through the tank 157 (via line 209 and valve 211) into the reactor coolant system through line 159 containing valve 161; the water is heated in the core 47 and exits the reactor coolant system through nozzles 27, the hot leg 59, and then through line 183 containing valve 185. There may be provided, outside the containment shield 207, a steam generator make-up water tank 213 which connects with steam generator 61 through a line 215 containing a check valve 217, and a containment cooling pool 219 containing water 221 to cool the containment shield 207. Steam from the steam generator 61 is directed outside the containment shield 207 through line 223. This whole system is then enclosed in a shield building 225.

What is claimed is:
1. A nuclear reactor comprising:
   a substantially cylindrical flow liner having an open top, a cylindrical wall section, and a bottom wall, said cylindrical wall section forming a lower reactor internals chamber;
   an upright cylindrical barrel within said cylindrical wall section having a bottom support plate spaced from said bottom wall, forming a downcomer annular passage between the cylindrical wall section and said barrel, and an upright riser chamber within said barrel;

a lower internals portion in the cylindrical flow liner containing a nuclear core having at least one fuel assembly, comprising a plurality of elongated fuel rods containing nuclear fuel to provide a fission-type chain reaction, and a plurality of elongated control rod assemblies contained within elongated thimbles disposed between said fuel rods, located in the riser chamber of said barrel;

at least one hot primary coolant discharge means in said flow liner intermediate said lower internals portion and said open top;

at least one cooled primary coolant return means in said flow liner intermediate said lower internals portion and said open top;

means for circulating primary coolant, at an elevated pressure upwardly through said nuclear core and riser chamber for heating thereof and discharge therefrom, and cooled primary coolant downwardly through said downcomer;

a pressure vessel having an upper removable top, an intermediate cylindrical wall section and a lower wall section, enclosing said flow liner and lower internals portion, the lower wall thereof spaced from said flow liner to form a second annular chamber therebetween, and the intermediate cylindrical wall section thereof having at least one outlet nozzle communicating with said at least one discharge means in the flow liner, and at least one inlet nozzle communicating with said at least one return means in the flow liner;

a supply of supplementary liquid coolant contained in said second annular chamber;

means communicating between said second annular chamber and said riser chamber for supplying supplementary liquid coolant directly to the nuclear core within said riser chamber;

means for cooling the major portion of said supplementary liquid coolant within said second annular chamber to a first elevated temperature; and means for maintaining a localized minor portion of said supplementary liquid coolant at a second elevated temperature in excess of said first elevated temperature, and approximate that of coolant in said cooled primary coolant return means; whereby upon a decrease in the pressure of the primary coolant in said riser below a predetermined pressure, volatilization of said localized minor portion of supplemental liquid coolant is effected and the pressure increase resulting therefrom in said second annular chamber will feed remaining supplemental coolant through said means communicating between said second annular chamber to said nuclear core in said riser chamber.

2. A nuclear reactor as defined in claim 1 wherein said means communicating between said second annular chamber and said riser chamber comprises at least one opening through said flow liner bottom wall and an axially aligned opening through said bottom support plate of the upright cylindrical barrel; hollow tubular members providing flow communication between the axially aligned openings in said bottom wall and said bottom support plate; and elongated thimble connected to said bottom support plate extending upwardly into said riser chamber in the region of each said fuel assembly, and closed at the top thereof, said elongated thimble having a plurality of spaced apertures therealong.

3. A nuclear reactor as defined in claim 2 wherein said means for cooling the major portion of said supplementary coolant within said second annular chamber comprises insulating means on said cylindrical wall section and bottom of said flow liner enclosed within said pressure vessel lower wall section.

4. A nuclear reactor as defined in claim 3 wherein said insulating means comprises spaced planar sheets which form said cylindrical wall section, and a supply of liquid enclosed within said spaced wall sections.

5. A nuclear reactor as defined in claim 4 wherein said supply of liquid comprises water and said spaced wall sections are formed from stainless steel.

6. A nuclear reactor as defined in claim 3 wherein said insulating means comprises a coating of insulation material on said cylindrical wall section and said bottom.

7. A nuclear reactor as defined in claim 3 wherein further said means for cooling the major portion of said supplementary coolant within said second annular chamber is provided comprising means for containing a pool of liquid coolant about the exterior surface of said pressure vessel lower wall section and bottom, to a level spaced from the top end of said second annular chamber to expose an upper region of said pressure vessel lower wall.

8. A nuclear reactor as defined in claim 7 wherein said means for maintaining a localized minor portion of said supplementary coolant at the second elevated temperature comprises a heat retentive coating on said exposed upper region of the pressure vessel lower wall.

9. A nuclear reactor as defined in claim 1 wherein said pressure vessel lower wall is spherical in shape.

10. A nuclear reactor as defined in claim 1 wherein said pressure vessel lower wall is cylindrical in shape.

11. A passive safety system for a pressurized water nuclear reactor wherein the reactor-vessel is contained in a shield building, with a heat-conducting containment shell situated in the shield building containing said reactor, at least one steam generator, a primary coolant circuit for the reactor having a hot leg and a cold leg, and with a pressurizer connected to said circuit for maintaining primary coolant therein at a predetermined pressure, comprising:

(a) a nuclear reactor having;

a substantially cylindrical flow liner having an open top, a cylindrical wall section, and a bottom wall, said cylindrical wall section forming a lower reactor internals chamber;

an upright cylindrical barrel within said cylindrical wall section having a bottom support plate spaced from said bottom wall, forming a downcomer annular passage between the cylindrical wall section and said barrel and an upright riser chamber within said barrel;

a lower internals portion in the cylindrical flow liner containing a nuclear core having at least one fuel assembly, comprising a plurality of elongated fuel rods containing nuclear fuel to provide a fission-type chain reaction, and a plurality of elongated control rod assemblies contained within elongated thimbles disposed between said fuel rods, located in the riser chamber of said barrel;

at least one hot primary coolant discharge means in said flow liner intermediate said lower internals portion and said open top;

at least one cooled primary coolant return means in said flow liner intermediate said lower internals portion and said open top;

means for circulating primary coolant, at an elevated pressure upwardly through said nuclear core and riser chamber for heating thereof and discharge therefrom, and cooled primary coolant downwardly through said downcomer;

a pressure vessel having an upper removable top, an intermediate cylindrical wall section and a lower wall section, enclosing said flow liner and lower internals portion, the lower wall thereof spaced from said flow liner to form a second annular chamber therebetween, and the intermediate cylindrical wall section thereof having at least one outlet nozzle communicating with said at least one discharge means in the flow liner, and at least one inlet nozzle communicating with said at least one return means in the flow liner;

a supply of supplementary liquid coolant contained in said second annular chamber;

means communicating between said second annular chamber and said riser chamber for supplying supplementary liquid coolant directly to the nuclear core within said riser chamber;

means for cooling the major portion of said supplementary liquid coolant within said second annular chamber to a first elevated temperature; and means for maintaining a localized minor portion of said supplementary liquid coolant at a second elevated temperature in excess of said first elevated temperature, and approximate that of coolant in said cooled primary coolant return means; whereby upon a decrease in the pressure of the primary coolant in said riser below a predetermined pressure, volatilization of said localized minor portion of supplemental liquid coolant is effected and the pressure increase resulting therefrom in said second annular chamber will feed remaining supplemental coolant through said means communicating between said second annular chamber to said nuclear core in said riser chamber;

(b) means for circulating water solely by natural convection from said hot leg to said cold leg with circumvention of said steam generator including:

means for heat exchange, for cooling water flowing from said hot leg to said cold leg; and valve means for allowing flow of water from said hot leg to said cold leg; and (c) further means for introducing stored coolant, under a superatmospheric pressure of gas, into the cylindrical vessel of said nuclear reactor.

12. A passive safety system as defined in claim 11 wherein said means for heat exchange includes a water storage tank within said containment shell adapted to contain a supply of water sufficient to flood the containment shell to a level above the hot leg, cold leg and reactor core, and a heat exchanger contained in said storage tank.

13. A passive safety system as defined in claim 12 wherein said heat exchanger has a horizontal intake manifold, an outlet manifold, and an interconnecting plurality of heat exchange tubes, first means connecting the inlet manifold with said hot leg and second means connecting the outlet manifold with said cold leg, and valve means are provided in said second means to control the flow of liquid therethrough.

14. A passive safety system as defined in claim 13 wherein a depressurizer line is provided between said pressurizer and said storage tank.

* * * * *